(No Model.)

C. H. MORRELL.
SCARF PIN AND OTHER PINNED JEWELRY.

No. 355,196. Patented Dec. 28, 1886.

WITNESSES.
John Becker
Jno. E. Gavin

INVENTOR
Charles H. Morrell,
by Chas. M. Higgins
Attorney

UNITED STATES PATENT OFFICE.

CHARLES H. MORRELL, OF NEW YORK, N. Y.

SCARF-PIN AND OTHER PINNED JEWELRY.

SPECIFICATION forming part of Letters Patent No. 355,196, dated December 28, 1886.

Application filed February 13, 1886. Serial No. 191,803. (No model.)

*To all whom it may concern:*

Be it known that I, CHARLES H. MORRELL, a citizen of the United States, residing at New York city, county and State of New York, have invented certain new and useful Improvements in Scarf-Pins and other Pinned Jewelry, of which the following is a specification.

This invention applies more especially to gentlemen's scarf-pins, but is also adapted for use in connection with other pinned jewelry; and it belongs to that class of pins which are provided with a guard or safety device, which engages with the point end or shank of the pin after it has been inserted in the scarf or other garment, and thus forms a barrier to the withdrawal of the pin, and therefore prevents its theft or accidental loss. Heretofore such devices have been made to engage with holes, slots, or recesses formed in the point end of the pin, or in other ways that necessitated the making of the point or shank of the pin otherwise than with a perfectly smooth surface, and in use such pins have been found to be objectionable, for the reason that they caught in the texture of the scarf and thus prevented their free insertion, besides tearing and damaging the scarf, while in that class of summer scarfs which are washable it was found practically impossible to insert such pins in them after they had been stiffened with starch, or "done up," without bending or injuring the pin.

Now, the main object of my invention is to construct a device which will securely engage with a perfectly plain pin-shank, and which can be easily attached to or removed from the pin, and which at the same time will be simple and cheap in its construction. According to my invention, therefore, I make the point and shank of the pin smooth and free from all holes, slots, or recesses, and I make the safety device in the form of a simple sleeve, adapted to freely slip over the puncturing end of the pin and along the shank thereof, and provided with a binding-screw to securely clamp the sleeve thereon, which screw has a stop or guard which limits its outward screw-motion and prevents its detachment from the sleeve.

Figure 1:
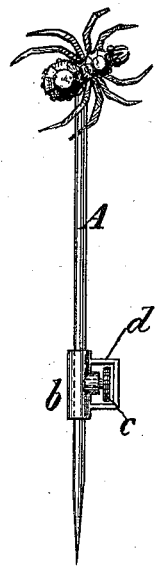
Figure 2:
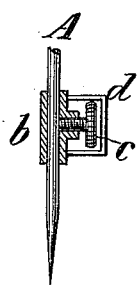
Figure 3:

In the drawings, Figure 1 presents a view of a gentleman's scarf-pin, showing my device attached thereto. Fig. 2 is an enlarged view, partly in section, showing the operation of the safety device. Fig. 3 is a modification.

In the figures, $b$ indicates the sleeve, which is adapted to fit loosely on the pin-shank A, and which is shown as of round or tubular form, but which might be made square or any other suitable shape.

$c$ indicates the set-screw, which screws laterally into the sleeve, and $d$ represents the guard or stop for the set-screw, and which prevents its being screwed out entirely, and thus prevents its complete detachment from the sleeve and consequent liability to loss, and yet permits of its easy operation.

Now, referring to Figs. 1 and 2, it will be understood that in using this device the pin is first stuck through the scarf until the point and a portion of the shank protrudes therefrom on the under side in the usual way. The sleeve is then slipped over the puncturing end of the pin, and upwardly thereon, to the point where it issues from the scarf, when the binding-screw is screwed down until it bears firmly on the pin-shank, and thus securely attaches the device thereto. It will be understood that when thus attached the scarf-pin cannot be withdrawn without previously removing the clamped sleeve, nor can it gradually work itself upward, and thus become displaced and so detract from its ornamental effect, as often occurs.

In connection with the binding-screw $c$, I use a guard or stop, $d$, which extends laterally from the sleeve $b$ and projects beyond the head of the screw, preferably in the form of an encircling yoke or bail, and thus prevents the screw from being withdrawn or unscrewed entirely from its screw-hole, which might result in its loss, and thus render the device useless. This encircling yoke or bail $d$ is permanently secured to the sleeve $b$ by soldering or otherwise after the binding-screw $c$ has been inserted in its screw-hole, as will be understood.

In Fig. 3 I have shown a modification of my invention, in which the sleeve, instead of being made in the form of a continuous tube or barrel, and having the binding-screw screwing laterally therein to engage with the pin, is made in the form of a split collar or tube, which encircles the pin-shank loosely, and is provided with projecting lugs $e\ e$, having screw-holes therein through which the binding-screw operates to tighten the collar on the pin-shank, thus securing a firm frictional engagement of the sleeve with the pin-shank. In this construction the point of the binding-screw might be slightly riveted, as shown at $d'$, Fig. 3, to prevent its detachment from the collar, and which will serve the same purpose as the stop $d$ in Figs. 1 and 2.

What I claim as my invention is—

1. The combination of the pin A, the removable sleeve $b$, sliding thereon and provided with a clamping-screw to clamp the sleeve upon the pin, with a stop to limit the unscrewing of the screw and prevent the loss thereof.

2. The combination, with the pin A and removable sleeve $b$, of the clamp-screw $c$, having a milled or operating head, and a stop, $d$, projecting from the sleeve in the path of the head, substantially as and for the purpose set forth.

CHARLES H. MORRELL.

Witnesses:
 JNO. E. GAVIN,
 CHAS. M. HIGGINS.